(12) United States Patent
Diedrich et al.

(10) Patent No.: US 10,120,213 B2
(45) Date of Patent: Nov. 6, 2018

(54) TEMPERATURE-COMPENSATED OPTICAL ISOLATOR

(71) Applicant: TOPTICA Photonics Inc. USA, Victor, NY (US)

(72) Inventors: Frank Diedrich, Karlsruhe (DE); Jerry Kuper, Pittsford, NY (US)

(73) Assignee: TOPTICA Phtonics Inc. USA, Victor, NY (US)

( * ) Notice: Subject to any disclaimer, the term of this patent is extended or adjusted under 35 U.S.C. 154(b) by 0 days.

(21) Appl. No.: 14/993,660

(22) Filed: Jan. 12, 2016

(65) Prior Publication Data

US 2017/0199401 A1    Jul. 13, 2017

(51) Int. Cl.
    *G02F 1/09*    (2006.01)
(52) U.S. Cl.
    CPC .................................. *G02F 1/093* (2013.01)
(58) Field of Classification Search
    CPC ................ G02F 1/09–1/0955; G02F 2001/094
    See application file for complete search history.

(56) References Cited

U.S. PATENT DOCUMENTS

2013/0258468 A1* 10/2013 Fukui .................... G02F 1/0955
                                                         359/484.03
2017/0038612 A1*  2/2017 Zhang .................... G02F 1/093

* cited by examiner

*Primary Examiner* — Stephone B Allen
*Assistant Examiner* — Adam W Booher
(74) *Attorney, Agent, or Firm* — Raymond R. Ferrera; Adams and Reese LLP

(57) ABSTRACT

The invention relates to an optical isolator comprising a polarizer adapted to polarize a beam of incident light to form a beam of polarized light, an analyzer adapted to transmit said beam of polarized light and to polarize back-reflected light, a magneto-optical element disposed between the polarizer and the analyzer, which magneto-optical element rotates the polarization direction of said beam of polarized light, and a magnet generating a magnetic field penetrating said magneto-optical element. It is an object of the invention to provide a temperature-compensated optical isolator that achieves a high degree of isolation at a minimum insertion loss over a given temperature range, without any need of manual tuning. The invention proposes to make provision for an automatic actuator mechanically connected to said magneto-optical element to move said magneto-optical element relative to said magnet in response to a temperature variation or in response to a variation of the wavelength of the incident light. Alternatively, the automatic actuator may be mechanically connected to said magnet to move said magnet relative to said magneto-optical element.

10 Claims, 3 Drawing Sheets

TEMPERATURE-COMPENSATED OPTICAL ISOLATOR

FIELD OF THE INVENTION

The invention relates to optical isolators.

BACKGROUND OF THE INVENTION

An optical isolator is an optical component allowing the transmission of light in only one direction. It is typically used to prevent various parts of an optical system from reflection-induced disturbance.

Typically, an optical isolator comprises a magneto-optical element called a Faraday rotator which is sandwiched between a pair of polarization elements commonly referred to as a polarizer and an analyzer. The Faraday rotator is used in optical devices, such as the optical isolator, to rotate the plane of polarization that is incident upon it by a predetermined amount, usually by 45° either clockwise or counter clockwise. The magneto-optical crystal Terbium Gallium Garnet (TGG) is an optimum material for the Faraday rotator. TGG has a combination of excellent properties such as a large Verdet constant (defined as the polarization rotation angle per unit path length and per unit magnetic field strength), low light loss, high thermal conductance and high light damage threshold. An external magnetic field generated by a magnet (e.g. a permanent magnet) penetrating the magneto-optical element is required to activate the Faraday rotator. The direction of Faraday rotation is dependent on the orientation of the magnetic field but not on the direction of light propagation.

In the forward direction, light incident on the polarizer will pass through the polarizer without obstruction if its direction of polarization coincides with that of the polarizer. When this light passes through the Faraday rotator its direction of polarization is rotated by 45° due to the magneto-optic effect. The direction of rotation, that is, clockwise or counter clockwise, is dependent on the particular Faraday rotator configuration and is predetermined. The light is then transmitted through the analyzer without loss, since the direction of polarization of the analyzer is oriented at the same 45° relative to the polarizer.

In the reverse direction, back-reflected light of arbitrary polarization is incident on the analyzer which transmits some of this light and polarizes it to match its direction of polarization. When this polarized reflected light passes through the Faraday rotator its direction of polarization is again rotated by 45°, clockwise or counterclockwise relative to the direction of light travel, as is predetermined. As a result, the direction of polarization of the back-reflected light incident on the polarizer is perpendicular to its direction of polarization, and, thus the back-reflected light is blocked by the polarizer. In this manner, the optical isolator is used to transmit light from a source in the forward direction and essentially extinguish any reflected light in the reverse direction.

The magnitude of the rotation of the direction of polarization of light transmitted through the Faraday rotator depends on several factors, such as, the strength of the magnetic field, the nature of the material that constitutes the Faraday rotator, the wavelength of the light, the temperature, and other parameters. The components in many optical applications utilizing the Faraday effect are exposed to temperature variations. Hence, the temperature dependency of the Faraday rotator limits their use in devices which do not provide some form of temperature compensation to prevent or minimize degradation in performance. Since the isolation (the attenuation in the reverse direction) of an optical isolator is measured very close to zero, small temperature-induced changes can have orders of magnitude effects on the degree of isolation in terms of the transmission of back-reflected light in the reverse direction.

One solution to this problem proposed in the prior art is to provide temperature compensation via a cooling/heating source which maintains the temperature of the Faraday rotator. This requires that the temperature of the Faraday rotator be monitored and the output from the cooling/heating source be adjusted accordingly. Thus, the components required in such a temperature compensation system would include at least a cooling/heating source, temperature measurement device, a feedback system, and a power supply. This disadvantageously adds to the complexity and cost of the optical isolator.

A temperature-compensated optical isolator is known from U.S. Pat. No. 6,252,708 B1. In the approach disclosed in this document, the optical isolator utilizes a bimetallic element to rotate the polarizer or the analyzer in response to temperature variations. This self-actuated tuning achieves a blocking of the light in the reverse direction even if the Faraday rotation is different from 45° due to temperature variations. The optical isolator thus maintains an effectively constant isolation over a substantially wide temperature range. However, the drawback is that the insertion loss of the optical isolator becomes higher and higher the more the Faraday rotation deviates from 45°.

It is further known in the art that tuning of the Faraday rotator for temperature-compensation can be achieved by variation of the magnetic field that acts along the length of the magneto-optical element. Such variation can be effectuated by a shift (displacement) of the magneto-optical element (wherein the position of the magnet is kept fixed) or, vice versa, by a shift (displacement) of the magnet (wherein the magneto-optical element is kept fixed). DE 195 06 498 C1 discloses an optical isolator consisting of a circular cylindrical CdMnTe crystal as a Faraday rotator sandwiched between two polarizers within two identical NdFeB annular permanent magnets arranged in a common housing. A set screw driven into a threaded bore in the top of the housing has a ferromagnetic tip whose movement in the axial direction is followed by the magnets. The set screw is operated manually for the purpose of compensating for temperature-induced variations of the Faraday rotation angle. The drawback of this approach is that manual tuning of the optical isolator is required which inhibits applications in which significant temperature variations occur and manual interventions are not feasible for practical reasons.

Against this background it is readily appreciated that there is a need for an improved optical isolator with temperature-compensation that is simple, low cost and dimensionally small.

SUMMARY OF THE INVENTION

It is thus an object of the invention to provide a temperature-compensated optical isolator that achieves a high degree of isolation at a minimum insertion loss over a given temperature range, without any need of manual tuning.

In accordance with the invention, an optical isolator is disclosed, comprising:

a polarizer adapted to polarize a beam of incident light to form a beam of polarized light;

an analyzer adapted to transmit the beam of polarized light and to polarize back-reflected light;

a magneto-optical element disposed between the polarizer and the analyzer, which magneto-optical element rotates the polarization direction of the beam of polarized light;

a magnet generating a magnetic field penetrating the magneto-optical element; and an automatic actuator mechanically connected to the magneto-optical element to move the magneto-optical element relative to the magnet in response to one or more of a temperature variation and a variation of the wavelength of the incident light.

As an alternative, the invention discloses an optical isolator comprising:

a polarizer adapted to polarize a beam of incident light to form a beam of polarized light;

an analyzer adapted to transmit the beam of polarized light and to polarize back-reflected light;

a magneto-optical element disposed between the polarizer and the analyzer, which magneto-optical element rotates the polarization direction of the beam of polarized light;

a magnet generating a magnetic field penetrating the magneto-optical element; and an automatic actuator mechanically connected to said magnet to move said magnet relative to said magneto-optical element in response to one or more of a temperature variation and a variation of the wavelength of the incident light.

It is an insight of the invention that self-actuated tuning of the optical isolator for the purpose of temperature-compensation and/or compensation of wavelength variations impacting the Faraday rotation can be achieved by variation of the strength of the magnetic field penetrating the magneto-optical element. The automatic actuator effects a relative displacement of the magnet and the magneto-optical element. As the magnetic field that is effective along the path of the light beam within the magneto-optical element depends on the relative positions of the magnet and the magneto-optical element, the compensation is achieved according to the invention by the automatic actuator directly translating a temperature and/or wavelength variation into a corresponding displacement of the component (the magnet or the magneto-optical element) to which it is mechanically connected. Comparatively small displacements (much smaller than the typical dimensions of the magnet) are sufficient to achieve a sufficient tuning range.

A temperature-induced deviation of the Faraday rotation angle from 45° of about 2° causes a drop of the total isolation of the optical isolator which is still within the tolerance (with typical specifications of optical isolators demanding a 30 dB isolation). As it turns out, the deviation of 2° translates into a relative displacement of the magnet and the magneto-optical element of about 0.2 mm in a typical configuration of the optical isolator. The total displacement stroke of the automatic actuator to achieve constant isolation over a temperature range of about 50 K is about 2 mm. It is thus an important insight of the invention that the displacement effected by the automatic actuator does not need to be very precise. It is sufficient if the setting of the actuator approximates the optimum relative positions of the magnet and the magneto-optical element with a 10% tolerance. The temperature-compensation of the optical isolator according to the invention can thus be realized in a simple manner at low cost.

The automatic actuator of the invention should maintain the Faraday rotation angle at 45°±2° over a temperature range of at least 50 K around a specified operating temperature. Correspondingly, the polarizer and the analyzer are permanently fixed at a relative angle of 45°. In this way, the self-actuated tuning is performed such that the transmitted light beam passes through the analyzer and the isolation in reverse direction is maximum.

In a preferred embodiment, the automatic actuator comprises a servo drive and a control circuit including a sensor adapted for sensing changes in rotation of the polarization direction, wherein the control circuit controls the servo drive in response to the changes. In view of the low requirements with regard to the tolerance of the displacement of the magnet or the magneto-optical element, the automatic actuator can easily be realized as servo-drive that is controlled by a control-circuit sensing the temperature- or wavelength-induced changes of the Faraday rotation angle.

For example, the sensor of the control circuit may detect the power of light reflected at the analyzer that is preferably realized as a polarizing beam splitter. The power of the reflected light depends on the deviation of the Faraday-rotation angle from the desired value of 45°. The control circuit can be arranged to control the servo drive to minimize the power of the reflected light.

The power of light reflected at the analyzer is symmetric with respect to the sign of the deviation of the Faraday rotation angle from the optimum set point. If a certain negative deviation produces a specific light power as sensor signal, the exact same, however positive deviation with will produce the identical sensor signal. An antisymmetric sensor signal, which is better suited for the purpose of controlling the relative positions of the magnet and the magneto-optic element, can be obtained by making provision for means for modulating the magnetic field penetrating the magneto-optical element, the wavelength of the incident light, or the temperature of the magneto-optical element, wherein the sensor is adapted for phase-sensitive detection of the power of light reflected at the analyzer in analogy to the known Pound Drever Hall principle. The modulation of the magnetic field may be achieved, for example, by a magnet coil activated by an AC current that encircles the magneto-optical element. Alternatively, the location of the magnet may be modulated, for example by an elastic mount of the magnet and mechanical periodic excitation with an appropriate driving mechanism (such as, e.g., a so-called galvo drive), or by modulation of the location of the magneto-optical element, for example by an elastic mount of the magneto-optical element and mechanical periodic excitation with a galvo drive. The temperature of the magneto-optical element may be modulated, e.g., using a resistive heating foil activated by an AC current. The wavelength of the incident light may be modulated, e.g., by modulating the current of a laser diode generating the incident light beam or by any other appropriate modulating scheme relating to the respectively used light source.

In an alternative embodiment, the sensor may be adapted for sensing the inhomogeneity of the magnetic field in a direction perpendicular to the optical axis of the magneto-optical element. The radial inhomogeneity of the magnetic field within the magneto-optical element can be utilized to detect a change of the Faraday rotation angle. The integral strength of the magnetic field acting on the magneto-optical element is different on the optical axis as compared to a position a few millimeters off axis. For a given configuration of the optical isolator this difference may correspond to a difference of the Faraday rotation by, e.g., about 0.2°. Due to the radial inhomogeneity of the magnetic field temperature-induced variations of the Faraday rotation angle are different for beam portions propagating on axis and slightly off axis. This effect can be exploited to generate a sensor signal for controlling the relative positions of the magneto-optical element and the magnet according to the invention.

The servo drive used according to the invention for displacement of the magnet or the magneto-optical element may be of any known type, such as, e.g., a piezo drive, a galvo drive, or a simple worm drive. Preferably, the servo drive is a linear drive.

In an alternative embodiment, the automatic actuator may comprise a thermal expansion element. A thermal expansion element within the meaning of the invention is any element that comprises a material having a thermal expansion coefficient and converts a temperature change into a deflection. The advantage of the thermal expansion element as automatic actuator is that it operates passively such that no energy supply is required. Moreover, the thermal expansion element is simple in construction such that it is very compact and can be provided at low cost. A further advantage is that the passive thermal expansion element is essentially maintenance free.

In one possible embodiment, the thermal expansion element comprises a piston that is axially movable in a cylinder filled with a fluid having a non-zero thermal expansion coefficient. The incompressible fluid translates a temperature change directly into a corresponding change of the volume of the fluid which displaces the piston correspondingly. The cylinder may be provided with a (preferably variable) reservoir for the fluid such that the proportionality between temperature change and displacement of the magnet or the magneto-optical element can be adjusted as required.

According to another embodiment, the thermal expansion element comprises an elastically deformable closed body filled with a fluid having a non-zero thermal expansion coefficient. An advantage of the elastically deformable closed body is that its interior can be better sealed against the environment. The elastic restoring force of the body acts against the thermal expansion of the incompressible fluid so that the thermal expansion element works very precise and reproducible. Again, the interior of the body may be connected to a reservoir filled with the fluid in order to adjust the design with respect to the required proportionality between temperature change and displacement.

In a preferred embodiment, the elastically deformable closed body is fondled by two concentrically arranged (preferably metallic) bellows having different diameters, wherein the ring-shaped space between the two bellows is filled with the fluid. In this embodiment, the elasticity of the body is provided by the elastic properties of the bellows in their longitudinal direction. The fluid-filled tubular body formed by the two bellows translates a temperature change into a proportional elongation of the body such that a linear displacement of the magnet or the magneto-optical element is effectuated. This embodiment of the thermal expansion element is particularly well-suited for integration into existing designs of optical isolators. The two concentric bellows can be arranged concentrically with the optical axis of the optical isolator such that the magnet (which is typically of annular shape surrounding the magneto-optical element) or the magneto-optical element can be displaced along the direction of the optical axis. The fluid used in the thermal expansion element may be selected to provide an appropriate thermal expansion. It may be, e.g., hydraulic oil, acetone, or ammonia.

According to yet another preferred embodiment, the automatic actuator may comprise an element made of a shape memory alloy. The advantage of the element made of a shape memory alloy is again that it operates passively and that it is essentially maintenance free. Shape memory alloys reversibly change their form when heated and have a superior thermo-mechanic performance. The element can be designed with respect to geometry and material composition such that a change in temperature is translated into a deflection as required to compensate for a temperature- or wavelength-induced variation of the Faraday rotation. Shape-memory alloys are typically copper-aluminum-nickel or nickel-titanium alloys that can further comprise zinc, copper, gold and iron.

BRIEF DESCRIPTION OF THE DRAWINGS

The enclosed drawings disclose preferred embodiments of the present invention. It should be understood, however, that the drawings are designed for the purpose of illustration only and not as a definition of the limits of the invention. In the drawings.

DETAILED DESCRIPTION OF THE EMBODIMENTS

Figure 1:
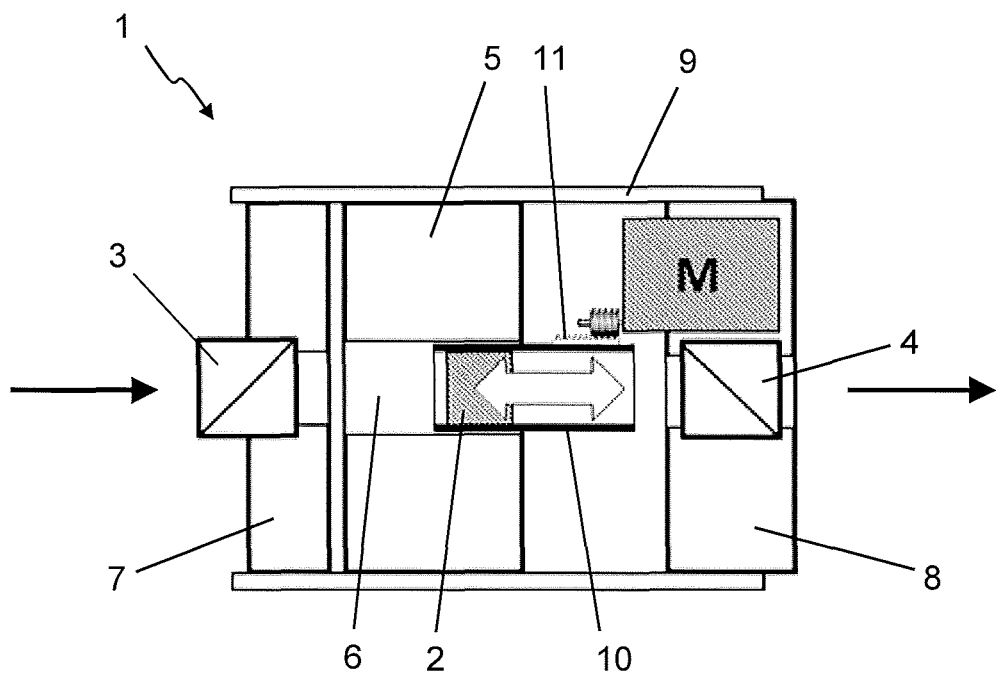
FIG. 1 schematically shows an optical isolator according to an embodiment of the invention in a sectional side view.

FIG. 1 schematically shows a sectional side view of an optical isolator 1 according to an embodiment of the invention. The optical isolator 1 comprises a magneto-optical element 2, namely a Faraday rotator which is sandwiched between a polarizer 3 and an analyzer 4. The Faraday rotator 2 rotates the plane of polarization that is incident upon it by 45°. The Faraday rotator 2 may be a Terbium Gallium Garnet (TGG) crystal. An external magnetic field is generated by a permanent magnet 5. The magnet 5 has a central bore 6 in which the Faraday rotator 2 is located. The magnetic field generated by magnet 5 penetrates the Faraday rotator 2. The polarizer 3 and the analyzer 4 are held in place by a base plate 7 and an end plate 8 arranged in the front and end openings of a tubular housing 9. The magnet 5 is fixed to the inside of the housing 9.

In the forward direction (indicated by solid arrows), the light incident on polarizer 3 passes through the polarizer 3 without obstruction if its direction of polarization coincides with that of the polarizer. When this light passes through the Faraday rotator 2 its direction of polarization is rotated by 45° due to the magneto-optic effect. The light is then transmitted through the analyzer 4 without loss, since the direction of polarization of the analyzer 4 is oriented at the same 45° relative to the polarizer 3. In the reverse direction (against the solid arrows), back-reflected light of arbitrary polarization is incident on the analyzer 4 which transmits some of this light and polarizes it to match its direction of polarization. When this polarized reflected light passes through the Faraday rotator 2 its direction of polarization is again rotated by 45° relative to the direction of light propagation. The direction of polarization of the back-reflected light incident on the polarizer 3 is perpendicular to its direction of polarization, and, thus the back-reflected light is blocked by the polarizer 3. In this manner, the optical isolator 1 is used to transmit light from a source in the forward direction (solid arrows) and essentially extinguish any reflected light in the reverse direction.

The angle of the rotation of the direction of polarization of the light transmitted through the Faraday rotator 2 depends (inter alia) on the temperature. The components of the optical isolator 1 are exposed to temperature variations, depending on the application in which the optical isolator is used. According to the invention, provision is made for a temperature compensation to prevent or minimize degradation in performance. The temperature compensation is achieved by an automatic actuator mechanically connected to the Faraday rotator 2 to move it relative to the magnet in response to a temperature variation.

In the embodiment depicted in FIG. 1, the automatic actuator comprises a servo drive for moving the Faraday rotator 2 relative to the magnet 5. The Faraday rotator 2 is moved axially in the central bore 6 of the magnet 5, as indicated by the double arrow. The Faraday rotator 2 is fixedly arranged in a sleeve 10 which is slidably guided in the bore 6 of the magnet 5. The sleeve 10 has a toothing 11 on its outer surface in the region outside of the magnet bore 6. The toothing 11 is engaged with a drive screw arranged on the drive shaft of a servo motor M. The servo motor M, the drive screw, the toothing 11 and the slidable sleeve 10 form the servo drive (in the form of a worm drive) for effecting the automatic temperature-dependent displacement of the Faraday rotator 2 according to the invention.

Figure 2:
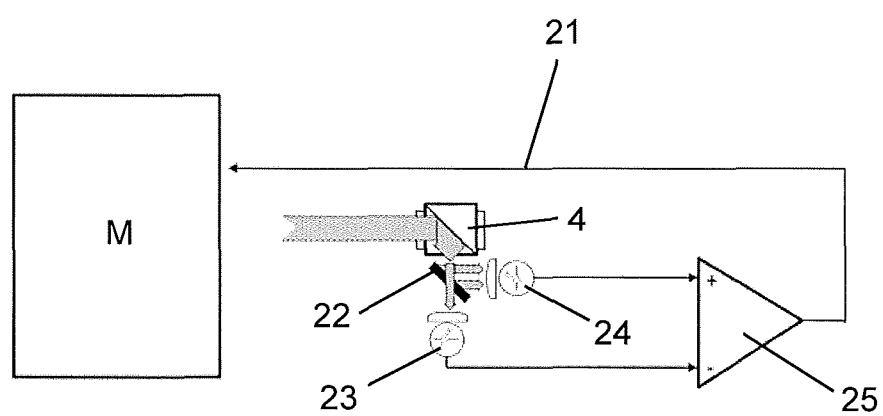
FIG. 2 schematically illustrates the control circuit used to control the servo drive in the embodiment of FIG. 1.

The servo drive of the optical isolator 1 shown in FIG. 1 is controlled by a control circuit which is illustrated in FIG. 2. The control scheme utilizes the radial inhomogeneity of the magnetic field in the central bore 6 of the magnet 5. The integral strength of the magnetic field acting on the Faraday rotator 2 is different on the optical axis as compared to a few millimeters off axis. This effect can be used to generate a servo signal 21 for controlling the servo motor M in the following manner. The light beam reflected at the analyzer 4 is separated into two parts, a central part and an annular part. This separation is achieved by a mirror 22 having a central hole (thus passing the central part and reflecting the annular part). Each beam part is imaged with a lens to a photodetector 23, 24 that generates a signal proportional to the received light power. The output signals of the photodetectors 23, 24 are used as inputs of a differential amplifier 25. The output signal of the amplifier 25 is proportional to the difference of the light power of the annular part of the beam and the central part of the beam. This difference indicates a temperature-induced variation of the Faraday rotation angle and can thus be used as a feedback signal to control the servo drive to displace the Faraday rotator 2 such that the Faraday rotation angle is maintained essentially constant at 45°.

The servo drive illustrated in FIGS. 1 and 2 adds to the cost of the optical isolator 1. This will be accepted only for applications with variable temperatures. It is thus advantageous to realize the servo drive as a separate module that can be added to the base configuration of the optical isolator 1 as an option. The base configuration only comprises the magnet 5 or the Faraday rotator 2 that can be displaced axially. In the base version, the optical isolator 1 may be adjusted manually to obtain the required 45° Faraday rotation at a specific temperature (and wavelength). With the servo option, this setting will be performed in a self-actuated fashion by the servo drive as explained above.

Figure 3:
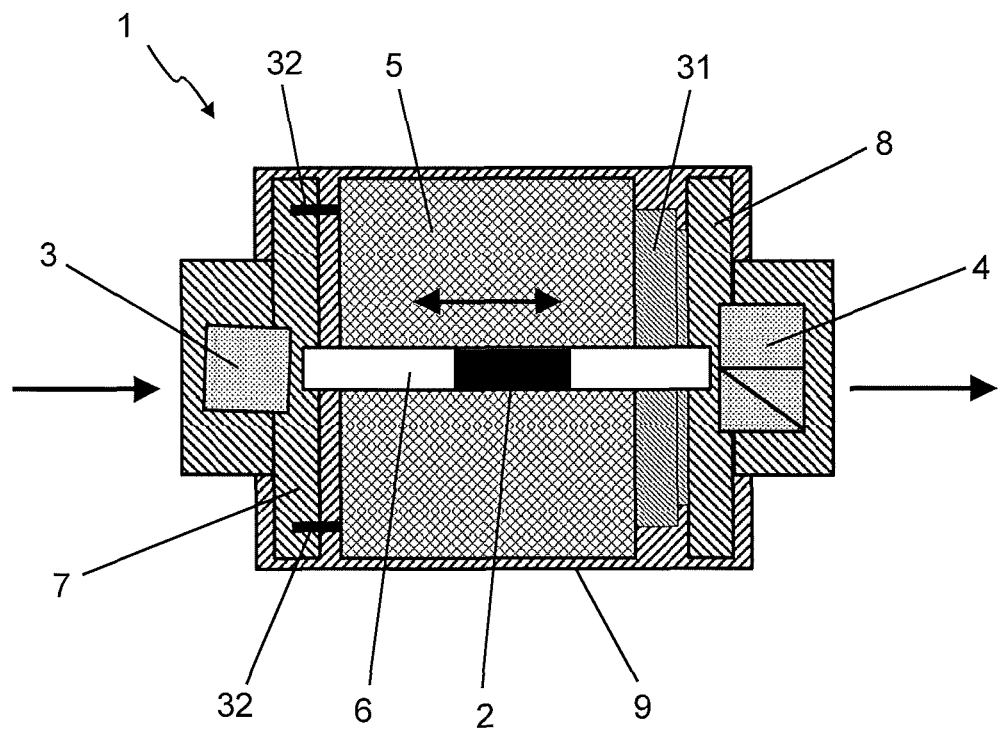
FIG. 3 schematically shows an optical isolator according to another embodiment of the invention in a sectional side view.
Figure 4:
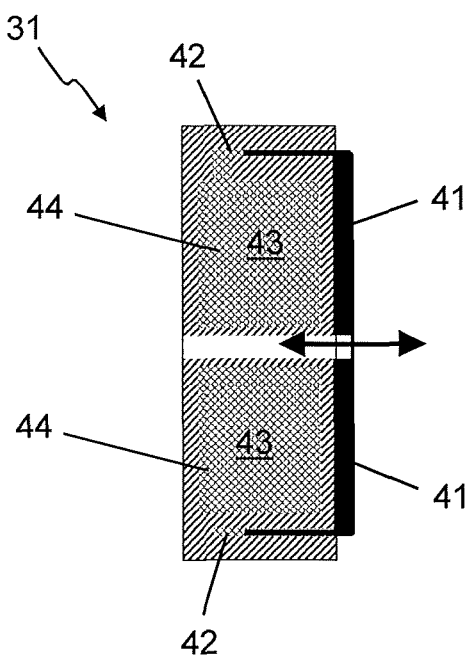
FIG. 4 illustrates an embodiment of a thermal expansion element according to the invention.

In the embodiment of the optical isolator 1 shown in FIG. 3, the magnet 5 is axially movable in the tubular housing 9. The magnet 5 is supported via springs 32 on the base plate 7. The Faraday rotator 2 is fixed. The temperature compensation is achieved by an automatic actuator 31 mechanically connected to the magnet 5 to move it relative to the Faraday rotator 2 in response to a temperature variation. In the depicted embodiment, the automatic actuator 31 comprises a thermal expansion element. The thermal expansion element comprises a material having a thermal expansion coefficient and converts a temperature change into a deflection. An expansion of the automatic actuator 31 operates against the restoring force of the springs 32. In contrast to the embodiment shown in FIGS. 1 and 3, the thermal expansion element as automatic actuator 31 operates passively such that no energy supply is required. As shown in more detail in FIG. 4, the automatic actuator 31 is constituted by a piston 41 that is axially movable in a ring-shaped cylinder 42 filled with a fluid 43 (hydraulic oil) having a non-zero thermal expansion coefficient. The fluid 43 translates a temperature change into a corresponding change of the volume of the fluid 43 which displaces the piston 41, as indicated by the double arrow in FIG. 4. The cylinder 42 is in fluid communication with a reservoir 44, wherein the volume of the reservoir 44 is selected such that the proportionality between a temperature change and the displacement of the magnet 5 exactly compensates the variation of the corresponding temperature-induced change of the Faraday rotation angle.

Figure 5:
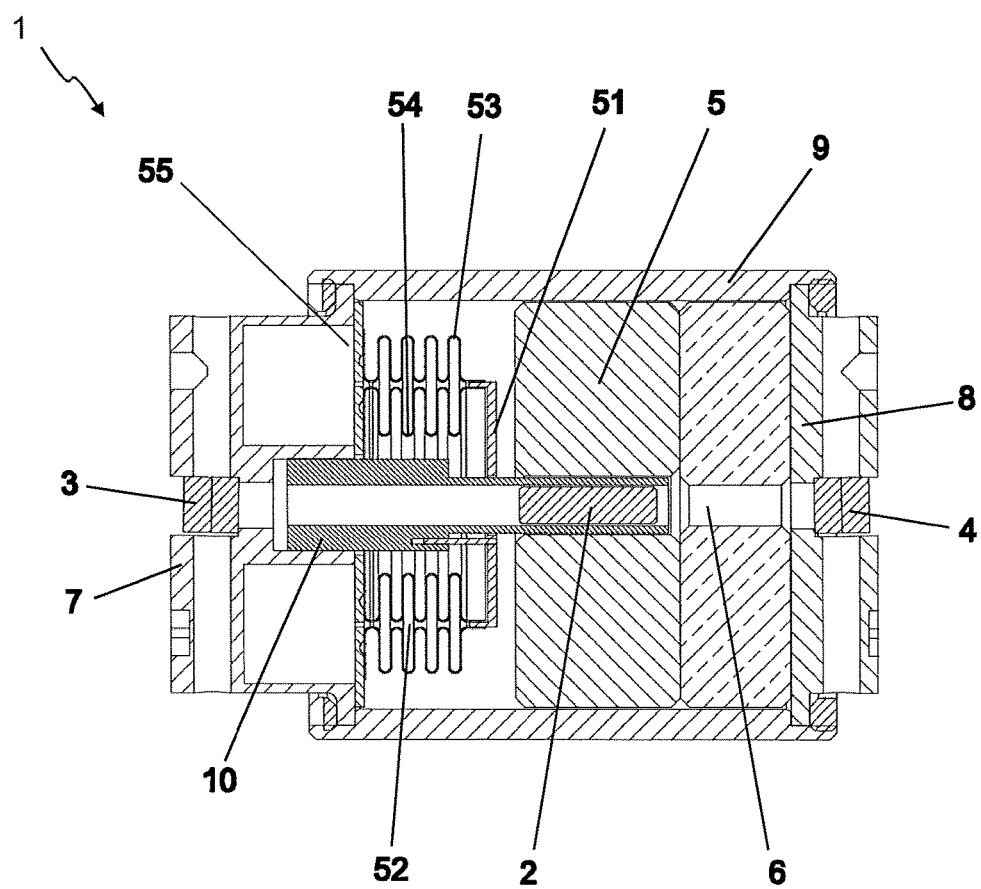
FIG. 5 shows a sectioned isometric view of an optical isolator according to yet another embodiment of the invention.

In the further embodiment of the optical isolator 1 shown in FIG. 5, the magnet 5 is fixed in the housing 9. The Faraday rotator 2 is fixedly arranged in the sleeve 10 which is slidably guided in the bore 6 of the magnet 5 and in a corresponding coaxial bore in the base plate 7. The sleeve 10 is mechanically connected to a push plate 51. The automatic actuator comprises a thermal expansion element formed by an elastically deformable closed body 52 of tubular shape filled with a fluid (hydraulic oil) having a non-zero thermal expansion coefficient. The body 52 is constituted by two concentrically arranged metal bellows 53, 54 having different diameters, wherein the ring-shaped space between the two bellows 53, 54 is filled with the fluid. The body 52 is attached to the base plate 7 with its proximal end face. The distal end face of the body 52 is connected to the push plate 51 such that a thermal expansion of the body 52 moves the sleeve 10 and the magneto-optical 2 axially in the magnet bore 6 in response to a temperature variation. The ring-shaped interior of the body 52 is in fluid communication with a reservoir 55 arranged in the base plate 7 such that the proportionality between a temperature change and the displacement of the Faraday rotator 2 matches the variation of the corresponding temperature-induced change of the Faraday rotation angle in the Faraday rotator 2 to effectuate the desired compensation. In this way, the Faraday rotation angle is maintained constant at essentially 45° over a specified temperature range of, e.g., 50 K around room temperature without any manual intervention by a user of the optical isolator 1.

The invention claimed is:
1. An optical isolator comprising:
   a polarizer adapted to polarize a beam of incident light to form a beam of polarized light;
   an analyzer adapted to transmit said beam of polarized light and to polarize back-reflected light;
   a magneto-optical element disposed between the polarizer and the analyzer, which magneto-optical element rotates the polarization direction of said beam of polarized light;
   a magnet generating a magnetic field penetrating said magneto-optical element; and an automatic actuator mechanically connected to said magneto-optical element to move said magneto-optical element relative to said magnet in response to one or more of a temperature variation and a variation of the wavelength of said incident light, wherein said automatic actuator further comprises a thermal expansion element comprising a piston that is axially movable in a cylinder filled with a fluid having a non-zero thermal expansion coefficient.

2. The isolator of claim 1, wherein said fluid further comprises one or more of hydraulic oil, acetone, and ammonia.

3. An optical isolator comprising:

a polarizer adapted to polarize a beam of incident light to form a beam of polarized light;

an analyzer adapted to transmit said beam of polarized light and to polarize back-reflected light;

a magneto-optical element disposed between the polarizer and the analyzer, which magneto-optical element rotates the polarization direction of said beam of polarized light;

a magnet generating a magnetic field penetrating said magneto-optical element; and an automatic actuator mechanically connected to said magneto-optical element to move said magneto-optical element relative to said magnet in response to one or more of a temperature variation and a variation of the wavelength of said incident light, wherein said automatic actuator further comprises a thermal expansion element comprising an elastically deformable closed body filled with a fluid having a non-zero thermal expansion coefficient.

4. The isolator of claim 3, wherein the interior of said body is disposed in fluid communication with a reservoir filled with said fluid.

5. The isolator of claim 3, wherein said body further comprises two concentrically arranged bellows having different diameters, wherein a ring-shaped space between said two bellows is filled with said fluid.

6. An optical isolator comprising:

a polarizer adapted to polarize a beam of incident light to form a beam of polarized light;

an analyzer adapted to transmit said beam of polarized light and to polarize back-reflected light;

a magneto-optical element disposed between the polarizer and the analyzer, which magneto-optical element rotates the polarization direction of said beam of polarized light;

a magnet generating a magnetic field penetrating said magneto-optical element; and an automatic actuator mechanically connected to said magnet to move said magnet relative to said magneto-optical element in response to one or more of a temperature variation and a variation of the wavelength of said incident light wherein said automatic actuator further comprises a thermal expansion element comprising a piston that is axially movable in a cylinder filled with a fluid having a non-zero thermal expansion coefficient.

7. The isolator of claim 6, wherein said fluid further comprises one or more of hydraulic oil, acetone, and ammonia.

8. An optical isolator comprising:

a polarizer adapted to polarize a beam of incident light to faun a beam of polarized light;

an analyzer adapted to transmit said beam of polarized light and to polarize back-reflected light;

a magneto-optical element disposed between the polarizer and the analyzer, which magneto-optical element rotates the polarization direction of said beam of polarized light;

a magnet generating a magnetic field penetrating said magneto-optical element; and an automatic actuator mechanically connected to said magnet to move said magnet relative to said magneto-optical element in response to one or more of a temperature variation and a variation of the wavelength of said incident light wherein said automatic actuator further comprises a thermal expansion element comprising an elastically deformable closed body filled with a fluid having a non-zero thermal expansion coefficient.

9. The isolator of claim 8, wherein the interior of said body is disposed in fluid communication with a reservoir filled with said fluid.

10. The isolator of claim 8, wherein said body further comprises two concentrically arranged bellows having different diameters, wherein a ring-shaped space between said two bellows is filled with said fluid.

* * * * *